United States Patent [19]

Miura et al.

[11] Patent Number: 4,591,924
[45] Date of Patent: May 27, 1986

[54] MULTIPLEX MAGNETIC RECORDING AND REPRODUCTION SYSTEM

[75] Inventors: Kuniaki Miura, Ibaraki; Yoshinori Okada, Katsuta; Isao Fukushima, Katsuta; Teizo Tamura, Katsuta, all of Japan

[73] Assignee: Hitachi, Ltd., Tokyo, Japan

[21] Appl. No.: 575,665

[22] Filed: Jan. 31, 1984

[30] Foreign Application Priority Data

Feb. 2, 1983 [JP] Japan .................................. 58-14501

[51] Int. Cl.$^4$ .............................................. H04N 9/80
[52] U.S. Cl. .................................. 358/330; 358/328; 360/64
[58] Field of Search ............... 358/310, 312, 321, 327, 358/328, 329, 343; 360/19.1, 64, 33.1

[56] References Cited

U.S. PATENT DOCUMENTS

| 3,846,819 | 11/1974 | Warren ............................ 358/328 |
| 3,925,816 | 12/1975 | Kihara ............................ 358/328 |
| 4,296,430 | 10/1981 | Warren ............................ 358/328 |
| 4,426,666 | 1/1984 | Kobayashi et al. ................ 358/312 |
| 4,453,186 | 6/1984 | Watatani et al. ................. 358/343 |
| 4,490,751 | 12/1984 | Kono et al. ...................... 358/343 |
| 4,491,880 | 1/1985 | Kojima et al. .................... 358/343 |

Primary Examiner—Donald McElheny, Jr.
Attorney, Agent, or Firm—Antonelli, Terry & Wands

[57] ABSTRACT

In a video tape recorder of the helical scan type, a pair of rotary magnetic heads for the audio signal are provided in addition to the rotary video heads so that the audio signal is recorded on the same slant track as of the video signal on a multiplex basis. The audio head pair is provided with an azimuth angle with opposite polarities from each other and different in value from that of the video head pair. The system has a first operation mode of the standard tape speed and a second operation mode in which the tape is fed at a speed, for example, ⅓ the standard tape speed. The audio and video head pairs are disposed on lines intersecting at right angles with an offset of $T_1/2+T_1$ provided in the axial direction of rotation between the two magnetic head pairs, where $T_1$ is the track pitch of the recording track formed on the tape in the second operation mode. The system produces overlapping tracks for the audio and video signals on the magnetic tape. In the first operation mode, the recording track is formed by a combination of magnetic heads providing an increased difference of azimuth angles between the audio and video heads, while in the second operation mode, the track is formed by a combination of magnetic heads providing a decreased difference of azimuth angles between the audio and video heads.

16 Claims, 19 Drawing Figures

MULTIPLEX MAGNETIC RECORDING AND REPRODUCTION SYSTEM

BACKGROUND OF THE INVENTION

The present invention relates to helical scanning magnetic recording and reproduction and, more particularly, to a magnetic recording and reproduction system capable of recording the audio signal with rotary magnetic heads on slant tracks of a magnetic tape where the video signal is recorded on a multiplex basis.

Figure 1:
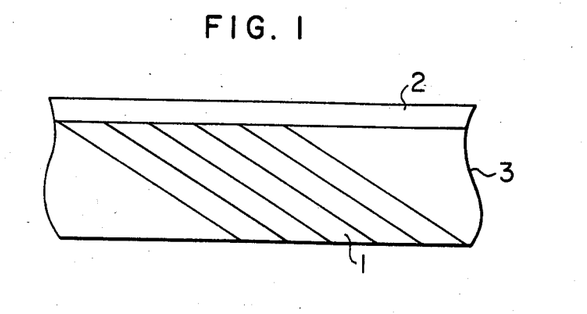
FIG. 1 is an illustration showing briefly the patterns of records produced on the magnetic tape by the conventional magnetic recording and reproduction system of the helical scan type.

In the helical scanning magnetic recording and reproduction system represented by video tape recorders and video cassette recorders, the video signal is recorded by the rotary heads on the recording medium, i.e., magnetic tape, in the form of tracks traversing askew the tape. In such recorders, the audio signal is generally recorded and reproduced on a separate track extending along the longitudinal direction of the tape by using a fixed magnetic head. FIG. 1 shows an example of these tracks formed on the magnetic tape by such a system. In the figure, reference number 1 denotes a track for recording the video signal, 2 is a track for recording the audio signal, and 3 is a magnetic tape. The figure shows the concept of recording tracks, and their dimensional relationship is not shown accurately. Other tracks such as for the control signals are omitted in the figure.

In household magnetic recording and reproduction apparatus, in particular, recording tracks for the video signal are made as narrow as possible without provision of a guard band between adjoining tracks so as to increase the recording density. On this account, the tape is fed at a very low speed. In order to further increase the recording density, many commercialized models have a "triple" recording mode in which the tape is recorded and reproduced at a speed ⅓ the standard tape speed so as to achieve the recording period three times as long as that in the normal operation mode using the same tape. In the case of a video cassette recorder handling NTSC signals of a "VHS" system, for example, the tape speed is 11 mm/sec in the dense recording mode. Such a low tape speed, however, does, not provide frequency characteristics sufficient to produce satisfactory sound quality through the recording and reproduction of the audio signal with a fixed magnetic head.

There has been proposed a method of tape recording and reproduction at a low tape speed, in which the audio signal is frequency modulated, for example, and recorded on a multiplex basis with the video signal by employment of rotary magnetic heads which provide a sufficient relative speed between each head and the recording medium. One feasible way to achieve high quality sound reproduction in triple density mode at a low tape speed is the application of the above-mentioned technique to household video cassette recorder of, for example, the "VHS" system.

However, in application of a new recording system to the prevailing magnetic recording and reproduction apparatus such as those of "VHS" system, compatibility must be retained for the reproduction of signals other than newly arranged audio signals. Therefore, the frequency spectra of the recording signal can not be changed. In addition, the above-mentioned multiplexing of the audio and video signals was not taken into account in the establishment stage of the "VHS" system, and therefore, the frequency modulated audio signal can not simply be multiplexed with the video signal.

SUMMARY OF THE INVENTION

It is an object of the present invention to provide a magnetic recording and reproduction system capable of multiplex audio signal recording without interfering with the video signal and having a compatibility with the conventional apparatus in reproducing the video signal.

One feature of the present invention is the arrangement of rotary magnetic heads including, in addition to a pair of video heads with gaps of different azimuth angles, an additional pair of heads having different azimuth angles from each other and from those of the video heads, the head arrangement being made such that the audio signal is recorded first on the tape and thereafter the video signal is recorded so as to at least partly overlap the record of the audio signal. The video and audio heads are disposed to meet the following conditions. Namely, in the first operation mode in which the tape is fed at the standard speed, each audio head has an azimuth angle which is much different from that of the video head with its majority of record overlapping the record of the audio signal which has been recorded first, and in the second operation mode in which the tape is fed slower, e.g., ⅓ of the standard tape speed, each audio head has an azimuth angle which is less different from that of the video head with its majority of record overlapping the record of the audio signal.

Preferably, the arrangement is made such that a pair of video heads have azimuth angles of $+\theta_1$ and $-\theta_1$ with respect to the line perpendicular to the plane of rotation, while a pair of audio heads have azimuth angles of $+\theta_2$ larger than $\theta_1$ and $-\theta_2$ with respect to the line perpendicular to the plane of rotation, with the line connecting the centers of both video heads intersecting the line connecting the centers of both audio heads at substantially right angles, and with an offset of $T_1/2 + T_1$ being made in head axial direction between the video head pair and the audio head pair, where $T_1$ is the track pitch of the second operation mode.

Although the following description of the preferred embodiment of the invention concerns the magnetic recording and reproduction system handling NTSC signals of the "VHS" system and having the first operation mode of standard density recording and the second operation mode of triple density recording, the invention is not limited to such a system, but is applicable to any magnetic recording and reproduction system having a plurality of operation modes of separate tape speeds and operating to record and reproduce a plurality of multiplexed signals. The signal form is not liminted to NTSC, but other forms such as PAL and SECAM can also be covered by the present invention.

BRIEF DESCRIPTION OF THE DRAWINGS

The present invention will be more apparent from the following detailed description taken in conjunction with the accompanying drawings, in which.

DESCRIPTION OF THE PREFERRED EMBODIMENTS

In multiplexing the audio signal with the video signal in household video cassette recorders of the "VHS" system or the like, it is difficult to use frequencies above the frequency band of the frequency-modulated luminance signal. Below the luminance signal band, however, there is already placed the chrominance signal with the lowered carrier frequency, and little space is left between these signals for frequency division multiplexing without the interference of signals.

The present invention contemplates to achieve recording and reproduction of the frequency-modulated audio signal with reduced interference with the video signal by provision of separate rotating magnetic heads having different azimuth angles from those of the video heads. The reduction of the mutual influence of the signals accomplished by the different azimuth angles of both heads is further enhanced by placing the frequency-modulated audio signal between the frequency-modulated luminance signal band and the down-converted frequency chrominance signal band, and in addition, by disposing the audio heads appropriately as will be described later.

Figure 2:
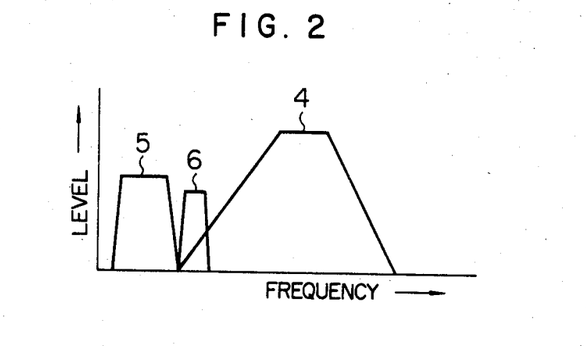
FIG. 2 is a graph showing an example of frequency spectra of the video and audio signals recorded by the rotary magnetic head.

FIG. 2 shows the frequency spectra of the recording video and audio signals according to the present invention. The frequency-modulated audio signal is placed in a band in the lowest portion of the lower sideband of the frequency-modulated luminance signal 4 and above the down-converted frequency chrominance signal 5. The frequency-modulated luminance signal 4 and chrominance signal 5 have each band width specified in the "VHS" standard, which does not allow for a marginal band between these signals for multiplexing the audio signal. On this account, the frequency-modulated audio signal 6 overlaps part of the lower sideband of the frequency-modulated luminance signal 4. If these signals are multiplexed directly and recorded with a common magnetic head, the signals will possibly interfere with each other.

Figure 3:
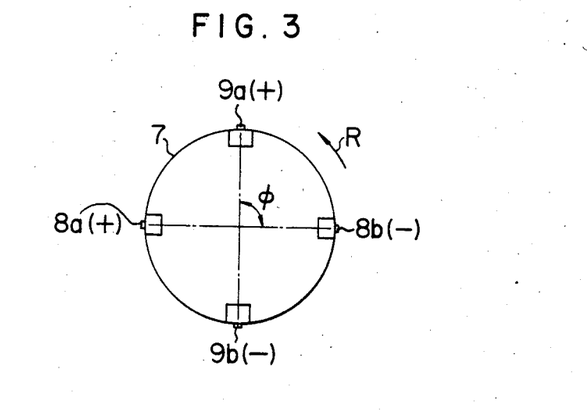
FIG. 3 is an illustration showing the planar arrangement of the rotary magnetic head embodying the present invention.

To prevent the interference of the signals, a pair of magnetic heads 9a and 9b for the audio signal are provided in addition to a pair of magnetic heads 8a and 8b for the video signal on a rotary disk or drum 7 as shown in FIG. 3, so that the frequency-modulated audio signal 6 is recorded and reproduced by the audio heads 9a and 9b. The gaps of the video heads 8a and 8b, as it is well known in the art, have different azimuth angles, and generally they are set askew at angles $\pm\theta$, i.e., the same value and opposite polarities with respect to the line perpendicular to the plane of rotation of the head drum 7. The audio heads 9a and 9b are also provided with azimuth angles for their gaps, and these angles have, for example, a value different from that of the video heads and opposite in polarity from each other. The magnetic heads 8a and 9a are made to have positive azimuth angles, while the heads 8b and 9b have negative azimuth angles. The heads 8a and 8b are disposed with an angular spacing of 180° on the rotary disk or drum 7 as in the usual 2-head helical scanning magnetic recording and reproduction system, and the heads 9a and 9b are also disposed 180° apart from each other. The spatial relationship between the video heads 8a and 8b and audio heads 9a and 9b may be made such that, for example, the line connecting the centers of both video heads intersects the line connecting the centers of the audio heads at right angles as shown in the figure.

The following describes the operation of the magnetic recording and reproduction system handling NTSC signals or the VHS system in standard operation mode (the mode in which the records of horizontal sync signal on adjoining tracks have a displacement of $a_H=1.5$ at the beginning of the video track) and in triple density mode ($a_H=0.5$).

Figure 4:
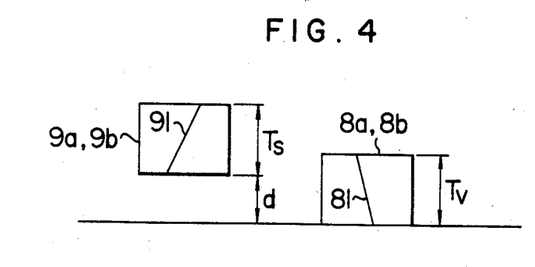
FIG. 4 is an illustration showing the axial arrangement of the rotary magnetic head embodying the present invention.

In order for the video heads 8a and 8b to trace for recording the greatest portion of tracks which have been recorded by the audio head 9a and 9b in triple density mode, i.e., the second operation mode, when the head drum is rotated in the direction shown by the arrow R, it is necessary, for example, to provide an offset d in the axial direction between the video heads 8a and 8b and the audio heads 9a and 9b as in FIG. 4. This figure intends to show the offset between the video and audio heads and does not represent other spatial relationship or actual dimensions and shape of the heads. In the figure, reference numbers 81 and 91 denote gaps of the video and audio heads. The audio heads are assumed to have an effective gap width Ts of 25 μm (since the gap is provided with a certain azimuth angle as mentioned above, the effective gap width is defined here to be the width effective in the recording and reproducing operation on the magnetic tape, instead of the width measured along the gap), and the video heads 8a and 8b are assumed to have an effective gap width Tv of 30 μm, with an azimuth angle of +30° provided for the head 9a, −30° for the head 9b, +6° for the head 8a, and −6° for the head 8b.

Figure 5:
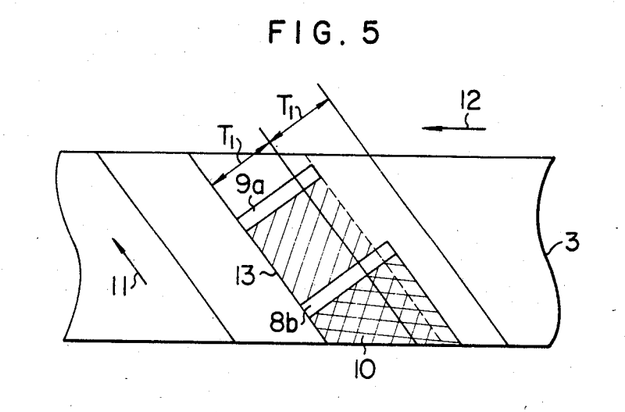
FIGS. 5 and 6 are illustrations showing record patterns on the tape produced in triple density mode and standard density mode, respectively, by the head arrangement shown in FIG. 4.

FIG. 5 shows the record patterns in triple density mode with a track pitch $T_1$ of 19.3 μm. The tape 3 is fed in the direction shown by the arrow 12, and the heads 8a, 8b, 9a and 9b move in the direction shown by the arrow 11. The audio head 9a scans the tape first to record the audio signal in a width (Ts) wider than the track pitch $T_1$, and thereafter the video head 8b scans the tape over the record of the audio signal to record the video signal in a width (Tv) wider than the audio track width. The reason for recording the audio signal first and the video signal next is that the frequency-modulated audio signal 6 having lower frequency components than the frequency-modulated luminance signal 4, as shown in FIG. 2, produces the record of longer wavelength that survives without being erased completely by the erasing action when the video signal of shorter wavelength is recorded over it. In order for the video head 8b to trace the audio head 9a for recording in the above-mentioned spatial relationship, the amount of offset d shown in FIG. 4 should be determined to meet the following equation.

$$d \geq T_1 \cdot \frac{\phi}{180} \quad (1)$$

Here, parameter $\phi$ represents the angular spacing (in degrees) between the video and audio heads as shown in FIG. 3, measured from the video head 8b to the audio head 9a along the rotational direction R. Accordingly, in the case of $\phi = 90°$ as shown in FIG. 3, the offset d should be:

$$d \geq \frac{T_1}{2} \quad (2)$$

For the track pitch of $T_1 = 19.3$ μm in triple density mode, the offset should take a value of approximately 9.7 μm or larger. To obtain the record patterns shown in FIG. 5, the offset is set to $d = T_1/2$, and in this case, the lower edges 13 of the audio and video tracks coincide as shown. As the tape 3 and rotary head move on, when the next head 9b starts recording, the tracks recorded by the previous heads 9a and 8b having respective gap width Ts and Tv wider than the track pitch $T_1$ are erased by the recording operation of the heads 9b and 8a, leaving portions inside the range of the track pitch $T_1$, and then a new recording track (not shown) is formed. These operations are repeated through the movement of the tape and rotation of the rotary head, and record patterns having a width of $T_1$ are formed. Each track has a record of multiplexed audio and video signals produced by audio and video heads having azimuth angles with opposite polarities, and this large difference of azimuth angles effectively prevents the interference of signals in the reproducing operation.

Figure 6:
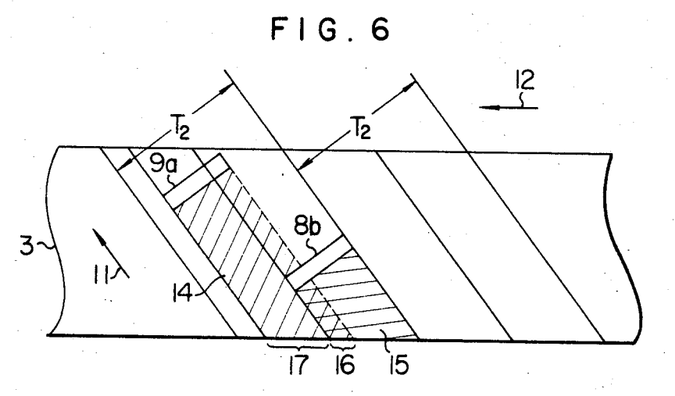

FIG. 6 shows the record patterns produced by the foregoing head arrangement in standard density mode. In standard operation mode of "VHS" system, the track pitch has a value of $T_2 = 58$ μm which is larger than the effective gap width of both heads, and therefore the displacement occurs between the audio track and video track. The recording track produced by the audio head 9a is shown by 14 and that produced by the video head 8b is shown by 15 in the figure. On this account, only a small part 16 of the audio track 14 is erased by the following recording operation for the video signal, with a remaining portion 17 of the audio record being left in a complete state. This formation of recording tracks is identical to the recording operation by the audio head 9b and video head 8a.

Thus, a record pattern of completely overlapping audio and video tracks is produced in triple density mode, allowing the conventional system without having rotating audio heads to reproduce the video signal perfectly. Whereas, in standard operation mode, the record of audio signal in the portion 17 out of the recording track 14 shown in FIG. 6 is tact without being weakened, and when such a tape reproduced by another system with a head gap width larger than $T_2$ (58 μm), the audio signal at a significant level is picked up from the portion 17 even though it has been recorded with a greatly different azimuth angle, causing possibly the interference with the video signal. In addition, there is a relatively large displacement between the centers of the audio track 14 and video track 15, that might restrict the compatibility of systems having various head arrangements.

Figure 7:
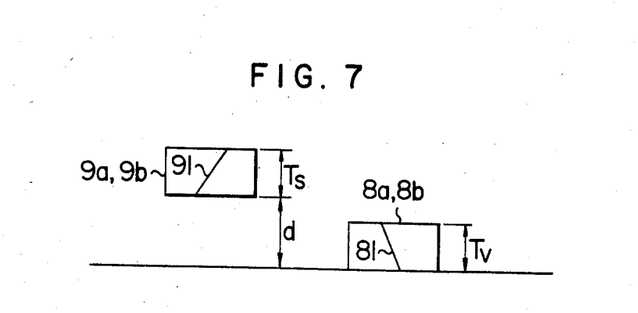
FIG. 7 is an illustration showing the axial arrangement of the rotary magnetic head according to another embodiment of the invention.

The following describes another embodiment of the invention contemplating the improvement with respect to the above problem. FIG. 7 shows the modified head arrangement in the axial direction, in which the offset d between the video heads 8a and 8b and the audio heads 9a and 9b is set larger than the case of FIG. 4, while the planar head arrangement is identical to that of FIG. 3. The offset is set, for example, to meet the following equation.

$$d = \frac{T_1}{2} + T_1 \quad (3)$$

Figure 8:
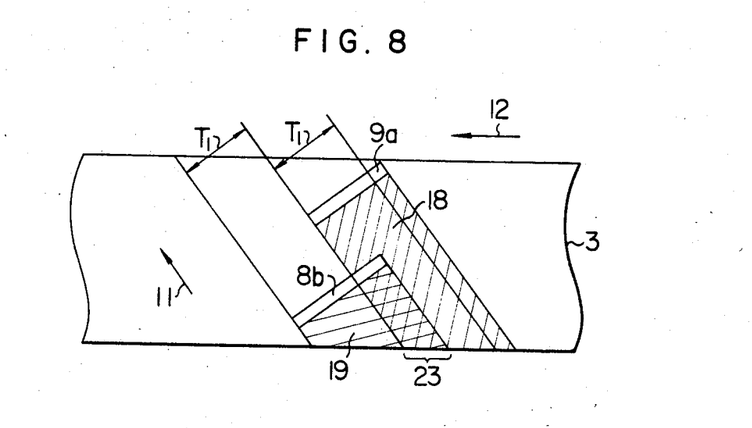
FIGS. 8 and 9 are illustrations showing the patterns of records produced in triple density mode by the head arrangement shown in FIG. 7.
Figure 9:
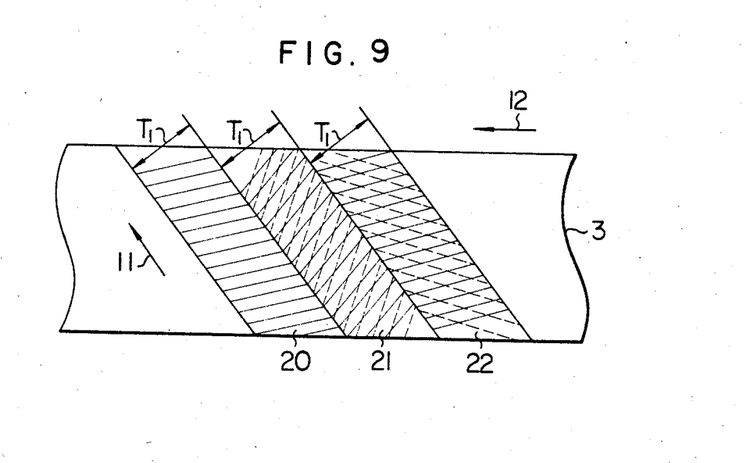

Also in this case, Equations (1) and (2) which are the conditions of overlap recording for the audio and video signals are satisfied. The state of recording caused by the provision of such an offset in triple density mode will be described in connection with FIGS. 8 and 9. Since the offset d between the audio and video heads is larger than the case shown in FIG. 4 by the amount equal to the track pitch $T_1$ as given by Equation (3), the audio and video signals are recorded such that the lower edge of the video recording track 18 produced by the video head 8b is displaced from the lower edge of the audio recording track 19 produced earlier by the audio head 9a by the amount of track pitch $T_1$. On this account, a lower portion 23 of the audio track 18 is overlaid by the video signal record for a range equal to the difference between the effective gap width Tv and the track pitch $T_1$. The whole recording track 18 is overlaid by the video signal record in the next scanning operation by the video head 8a. Thus, record patterns will be produced as shown in FIG. 9. Namely, the track 19 of FIG. 8 recorded by the video head 8b is drawn as track 20 in FIG. 9, the next track 21 is a track produced for the audio signal by the audio head 9a as shown by dashed hatching and the video signal by the video head 8a as shown by solid hatching. The subsequent track 22 is a track produced for the audio signal by the audio head 9b as shown by dashed hatching and the video signal by the video head 8b as shown by solid hatching. Each hatching is made in correspondence to the azimuth of each head, showing a common polarity of azimuth angle for the audio and video heads on the same recording track as opposed to the case of FIG. 5. Also in this case, the audio head precedes the video head in recording, and the audio signal record is traced at least once by the video head, resulting in a partial erasure of the audio signal record. However, the audio signal, which has a longer recording wavelength, is recorded deep in the recording material of the tape, and it provides a sufficient reproduction level against the erasing action of the overlap recording operation for the video signal having shorter wavelength.

Figure 10:
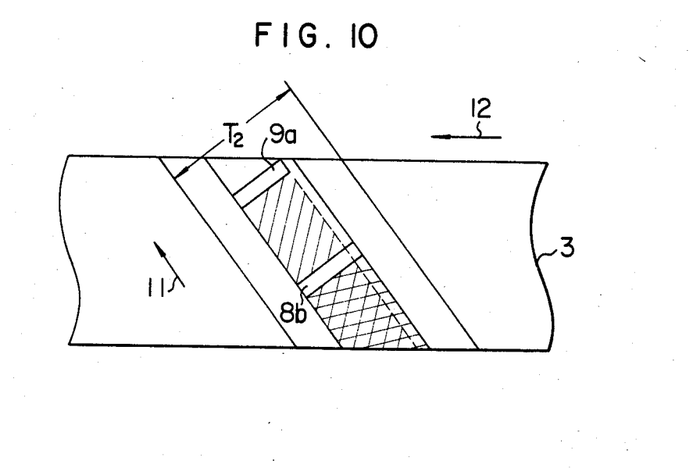
FIG. 10 is an illustration showing the patterns of records produced in standard density mode by the head arrangement shown in FIG. 7.

FIG. 10 shows the recording track patterns produced in standard density mode by the head arrangement shown in FIG. 7. In this case, the faster tape speed causes the recording track produced by the audio head 9a to be overlaid by the recording track produced by the video head 8b. Both heads have azimuth angles with opposite polarities as opposed to the case of FIG. 9. The condition of head arrangement to be met for the overlap of audio and video tracks in standard density mode is expressed as follows.

$$0 \leq d - T_2 \cdot \frac{\phi}{180} \leq Tv - Ts \quad (4)$$

The track pitch $T_2$ in standard mode is 58 μm, and on assumption that the audio and video heads are spaced out by $\phi = 90°$ and the video and audio heads have effective gap widths of $Tv = 30$ μm and $Ts = 25$ μm, respectively, as in the case of the previous embodiment, Equation (4) is reduced to as follows.

$$0 \leq d - 58 \times \tfrac{1}{2} \leq 5 \quad (5)$$

When the track pitch $T_1 = 19.3$ μm of triple density mode is substituted into Equation (3) which has been set up to meet Equation (1), i.e., the condition for overlap recording in triple density mode, the offset is evaluated as follows.

$$d = \frac{T_1}{2} + T_1 = 29$$

This value satisfies the condition of Equation (5). Accordingly, when the offset condition of Equation (3) is met, i.e., $d = 29$ μm in this case, the condition of overlap recording for the audio and video signals is fulfilled in both standard and triple density modes. As a result, the audio and video signals are multiplexed to form a recording track in both operation modes, and the compatibility with conventional systems can be obtained. Moreover, when the tape is reproduced in standard operation mode by a system having a wider gap width (larger than 58 μm) of the magnetic head, the audio signal does not interfere with the video signal.

Although, in the above embodiment of the triple mode, the audio and video heads recording the same track have azimuth angles of the same polarity, making it likely to be disadvantageous for the interference of both signals, however, for a system with an effective head gap width larger than the track pitch as of the case of the embodiment, the foregoing arrangement is optimal when considering the interference caused by the adjacent tracks. The reason for it will be described in the following.

Generally, the azimuth loss L is expressed in terms of the width of overlapping portion of the track W, the recording wavelength λ, the azimuth angle of the video head $\theta_1$, and the azimuth angle of the audio head $\theta_2$, as follows.

$$L = \left| \frac{\sin\left(\frac{\pi W}{\lambda}(\tan\theta_1 + \tan\theta_2)\right)}{\frac{\pi W}{\lambda}(\tan\theta_1 + \tan\theta_2)} \right| \quad (6)$$

Figure 11:
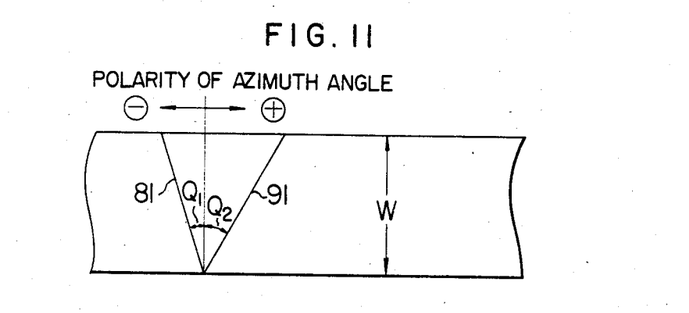
FIG. 11 is an illustration used to explain the azimuth angle of the magnetic head on the recording track.
Figure 12:
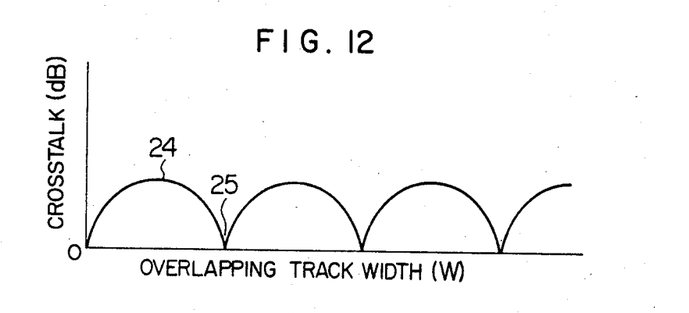
FIG. 12 is a graph showing the relationship between the width of overlapping records and the degree of crosstalk.

It seems likely from Equation (6) that the larger azimuth effect is obtained and less interference of the audio signal with the video signal is expected by provision of azimuth angles with opposite polarities for the overlapping track section W as shown in FIG. 11. However, the gap width Tv of the video head is chosen in triple density mode to be $Tv > T_1$ (where $T_1$ is the track pitch in triple density mode), causing the video head 8b to pick up the audio signal from the portion 23 of the track 18 recorded by the audio head 9a as shown in FIG. 8, resulting in a crosstalk. The amount of crosstalk (dB) is determined from the signal frequency (or wavelength), and the azimuth angles of the audio and video heads, and it is a periodic function of the width W of overlapping track as shown in FIG. 12. The amount of crosstalk has a smaller peak 24 when the audio and video heads have azimuth angles of opposite polarities, or has a larger peak when they have the same polarity of azimuth angle.

The following describes the idea of the present invention on the crosstalk from the audio signal to the video signal recorded on the main track of 19.3 μm (equal to $T_1$) and the adjacent track of 10.7 μm when the video head has an effective gap width of 30 μm. The main track is defined here to be the portions having width $T_1$ in FIGS. 8 and 9.

(1) Main track

For the main track, the video heads reproduce substantially the whole range (19.3 μm) of the track by the adjustment of the tracking adjustment variable resistor. Accordingly, the width of the overlapping tracks for the audio and video signals contributing to the crosstalk has a constant value of $W = T_1 = 19.3$ μm. This allows audio carrier wavelength λ to be chosen in the vicinity of the minimum point 25 of crosstalk shown in FIG. 12 when the overlapping track width is $W = 19.3$ μm. For example, with the azimuth angles of $\theta_1 = 6°$ and $\theta_2 = 30°$, the wavelength λ should be set to 4.4 μm. Accordingly, for the main track, the actual amount of crosstalk can be made small even if the audio and video heads are made to have azimuth angles of the same polarity and the amount of crosstalk has a large peak 24.

(2) Adjacent tracks

For the adjacent tracks, the width of overlapping tracks contributing to the crosstalk varies depending on indivisual values of the effective gap width and offset of the heads and the state of tracking. The signal may be subjected to crosstalk from both adjacent tracks. In this case, the peak 24 of crosstalk needs to be lowered, and it is desirable for the audio and video heads to have azimuth angles of opposite polarities so as to enhance the azimuth effect.

Thus, in triple density mode, the overlap recording condition is satisfied and the crosstalk can be minimized through the planar arrangement of heads as shown in FIG. 3 with an offset d between the audio and video heads being set to $d = T_1 \tfrac{1}{2} T_1$. In standard operation mode, no adjacent tracks exist as shown in FIG. 10, and therefore, the audio head 9a and video head 8b preferably have azimuth angles of opposite polarities so as to provide a large difference of angles, and the above embodiment meets this condition. The same is true for another audio head 9b and video head 8a.

The foregoing embodiment is summarized as follows.

(1) The arrangement for minimizing the crosstalk of the audio signal to the video signal in both standard and triple density modes can be realized. This means at the same time that the crosstalk of the video signal to the audio signal is made minimal.

(2) The centers of the audio and video tracks can be made substantially coincident in both standard and triple density mode. This feature is extremely advantageous on the viewpoint of compatibility.

(3) The audio signal is at least partially erased by the overlap recording for the video signal, preventing the video signal from interference by the audio signal which would otherwise be left on a full scale.

Figure 13:
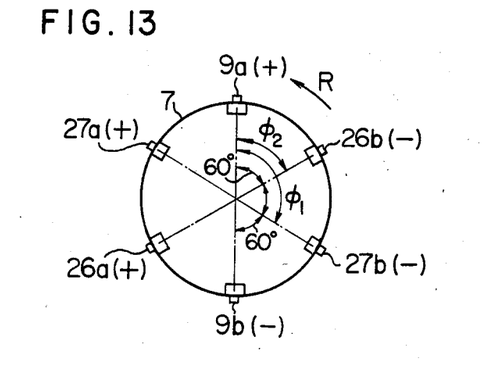
FIG. 13 is an illustration showing the planar arrangement of the rotary magnetic head according to another embodiment of the invention, where video head pairs for each operation mode are provided.
Figure 14:
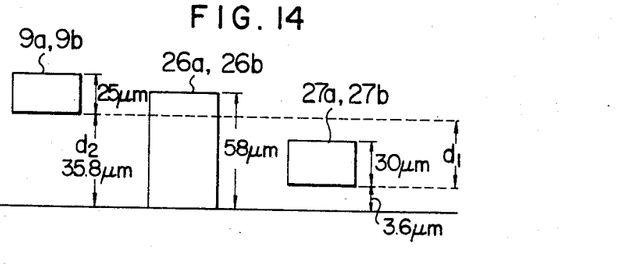
FIG. 14 is an illustration showing the axial arrangement of the head shown in FIG. 13.

FIGS. 13 and 14 show the head arrangement according to still another embodiment of the invention. In this embodiment, video heads 26a and 26b are provided for recording and reproduction in standard density mode, and video heads 27a and 27b are provided for triple density mode. Both video head pairs are made to have the same azimuth angle. These video heads and the audio heads may be arranged such that the lines connecting the centers of each head pair intersect each other at the same angle as shown in FIG. 13, so that the whole rotary head is well balanced. Also in this embodiment, the whole range of the audio signal recording track can be overlaid with the record of the video signal, by provision of an offset $d_1$ between the audio head 9a (9b) and the video head 27a (27b), and another offset $d_2$ between the audio head 9a (9b) and the video head 26a (26b) as shown in FIG. 14. The offsets $d_1$ and $d_2$ are set depending on the planar arrangement of the heads shown in FIG. 13 where the head 9a and head 27b are spaced out by $\phi_1$, and the head 9a and head 26b are spaced out by $100_2$, to meet the following conditions.

The offset $d_1$ for triple density mode is:

$$d_1 \geq T_1 \cdot \frac{\phi_1}{180} \quad (7)$$

and the offset $d_2$ for standard density mode is:

$$d_2 \geq T_2 \cdot \frac{\phi_2}{180} \quad (8)$$

For example, with the audio heads 9a and 9b having an effective gap width of 25 μm, the video heads having an effective gap width of 58 μm, the video heads 27a and 27b having an effective gap width of 30 μm, and with the planar spacing between these heads being set to $\phi_1=120°$ and $\phi_2=60°$, the offset $d_1$ can be set to 32.2 μm and $d_2$ to 35.8 μm as shown in FIG. 14. As mentioned previously, the track pitch in triple density mode is $T_1=19.3$ μm and that in standard density mode is $T_2=58$ μm, and the values of $d_1$ and $d_2$ satisfy Equations (7) and (8), respectively. In triple density mode, offset d is set to have a value:

$$d_1 = T_1 \cdot \frac{120}{180} + T_1 = 32.2 \text{ μm}$$

Figure 15:
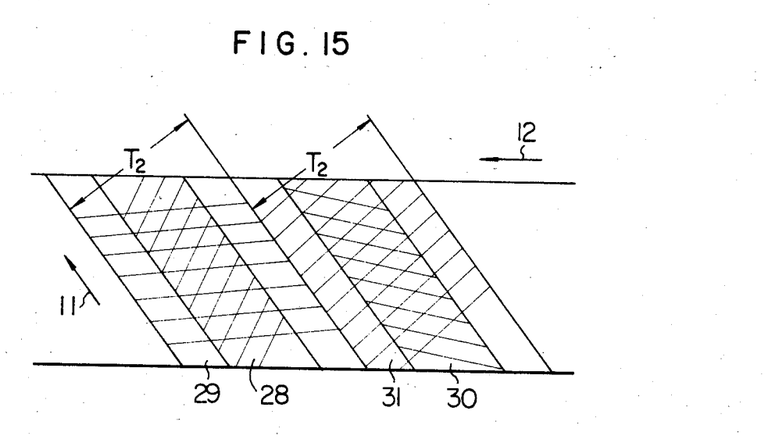
FIGS. 15, 18 and 19 are illustration showing the patterns of records produced in standard density mode by the head arrangement shown in FIGS. 13, 14, 16 and 17.

The reason for the increment of $T_1$ added to $T_1 \cdot 120/180$ is to provide a displacement of $T_1$ between the lower edge of the video track produced by the video head 27b and the lower edge of the audio track produced by the audio head 9a as in the case of the previous embodiment shown in FIG. 9. Record patterns produced on the tape in triple density mode by these setups of parameters are idential to those of the previous embodiment shown in FIG. 9. Accordingly, the crosstalk caused by the adjacent tracks can be reduced sufficiently as well as the crosstalk on the main track as in the case of the previous embodiment. Record patterns produced in standard density mode is as shown in FIG. 15. Namely, a recording track 28 produced by the audio head 9a having a gap width of 25 μm is overlaid by a recording track 29 having a larger width of the track pitch $T_2$ produced by the video head 26b, and for the next track, a recording track 30 of 25 μm produced by the audio head 9b is overlaid by a recording track 31 having a width of $T_2$ produced by the video head 26a. The centers of the audio and video tracks are substantially coincident, while both heads having azimuth angles of opposite polarities, and thus interference between the audio and video signals can be reduced and, at the same time, the reproduction compatibility with conventional systems can be retained.

Figure 16:
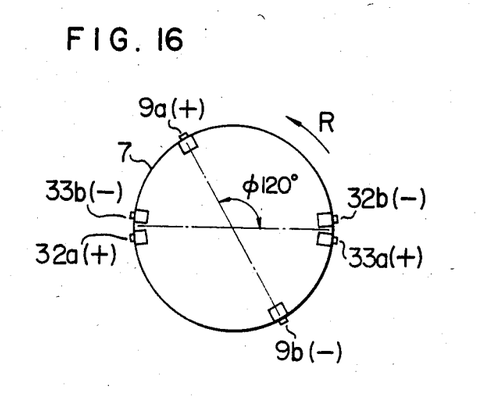
FIG. 16 is an illustration showing the modified planar arrangement of the rotary magnetic head, where separate video head pairs are provided for each operation mode.
Figure 17:
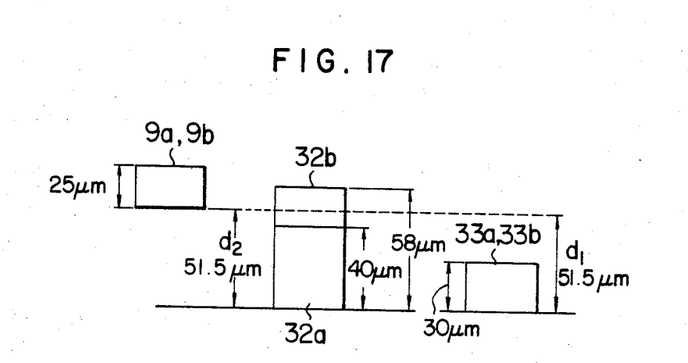
FIG. 17 is an illustration showing the axial arrangement of the head shown in FIG. 16.

The present invention is also applicable to the case of providing two sets of video heads dedicated to two operation modes, but different from the arrangement shown in FIG. 13 and in this case the video head 32a for standard density mode and the head 33b for tripple density mode are located nearer, and the head 32a for standard mode and the head 33a for triple mode are located nearer as shown in FIG. 16. With the video heads 32b and 33a being spaced out from the audio head 9a by angle $\phi$ as shown in FIG. 16, and with offsets $d_1$ and $d_2$ being provided between the audio heads 9a and 9b and the video heads 33a and 33b, and between the audio heads and the video heads 32a and 32b as shown in FIG. 17, the conditions for overlap recording for the audio and video signals in each operation mode are as follows. For triple density mode:

$$d_1 \geq T_1 \cdot \frac{\phi}{180} \quad (9)$$

For standard density mode:

$$d_2 \geq T_2 \cdot \frac{\phi}{180} \quad (10)$$

For the track pitches of $T_1=19.3$ μm and $T_2=58$ μm, Equations (9) and (10) are satisfied by setting the parameters as follows.

Gap width of video head 32a for standard mode: 40 μm

Gap width of video head 32b for standard mode: 58 μm

Gap width of video heads 33a and 33b for triple mode: 30 μm

Gap width of audio heads 9a and 9b: 25 μm

Head spacing shown in FIGS. 16 and 17: $\phi=120°$

Setting of offset $d_1=d_2=51.5$ μm satisfies Equations (9) and (10). Namely, in triple density mode:

$$d_1 = T_1 \cdot \frac{120}{180} + 2T_1 = 51.5 \text{ (where } T_1 = 19.3\text{)} \quad (11)$$

and in standard density mode:

$$d_2 = 51.5 > T_2 \cdot \frac{120}{180} = 38.7 \text{ (where } T_2 = 58.0\text{)}$$

The reason for the smaller effective gap width of the standard mode head 32a than the gap width of the head 32b is that in reproducing slow-motion or still pictures in triple density mode, the standard mode head 32a is used in conjunction with the triple mode heads 33a and 33b, and, on this account, the head 32a needs to have an effective gap width twice the track pitch of triple density mode, i.e., 19.3 μm, or less. Therefore, the head 32a has an effective gap width of 40 μm.

Figure 18:
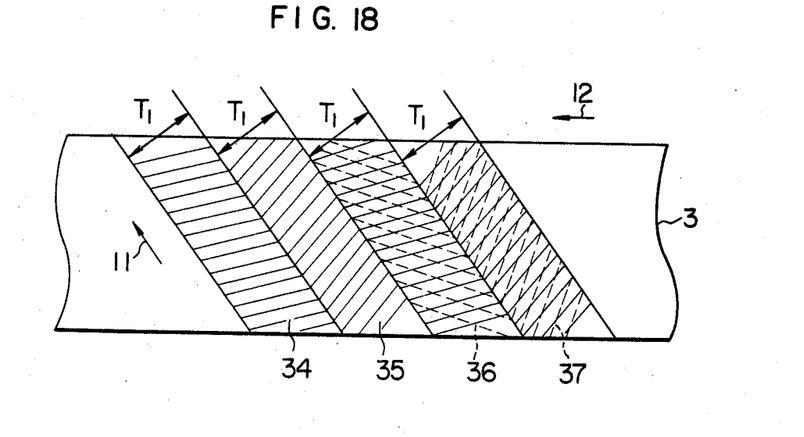

FIG. 18 shows the record pattern in triple density mode of this case. The audio head pair 9a and 9b is offset by $d_1$ as evaluated by Equation (11) from the video head pair 33a and 33b. This means that the audio heads 9a and 9b precede the video heads 9a and 9b on the tape by the amount corresponding to the angle φ plus two track pitches $2T_1$. Namely, when the audio head 9b forms a recording track 36 shown by dashed hatching, the video head 33b forms a recording track 34 shown by solid hatching. Similarly, when the audio head 9a forms a recording track 37 shown by dashed hatching, the video head 33a forms a recording track 35 shown by solid hatching. Subsequently, the audio signal recorded on the track 36 is overlaid by the recording track formed by the video head 33b, and the audio signal is erased incompletely. As a result, a recording track of the video signal shown by solid hatching is formed on the track 36. Similarly, the audio signal recorded on the track 37 is overlaid by the recording track formed by the video head 33a, and the audio signal is erased incompletely. As a result, a recording track of the video signal shown by solid hatching is formed on the track 37. That is, the audio and video signals are recorded on a multiplex basis on tracks spaced out by two track pitches $2T_1$.

However, the same record pattern as that of the previous embodiment shown in FIG. 9 is obtained. Although the time shift between video and audio signals differs from that in the previous embodiment, it is confirmed that no problem arises practically when the time shift is smaller than the frame period (1/30 sec).

Figure 19:
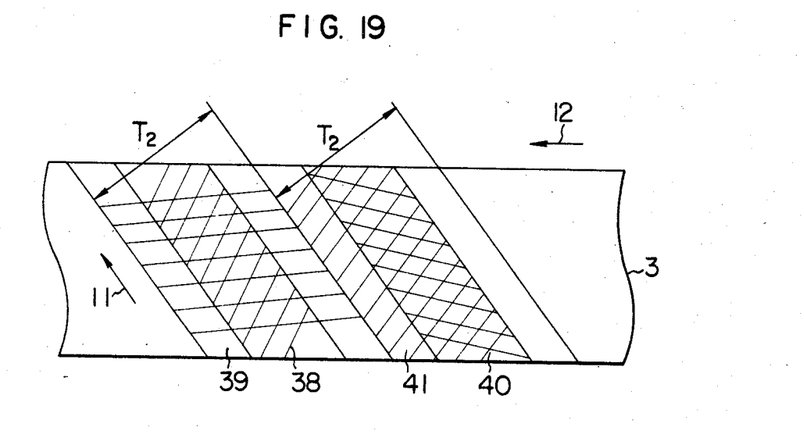

Record patterns in standard density mode are as shown in FIG. 19. Namely, an audio recording track 38 produced by the audio head 9a is overlaid by a video recording track 39 produced by the video head 32b, and for the next track an audio recording track 40 produced by the audio head 9b is overlaid by a video recording track 41 produced by the video head 32a.

Also in this embodiment, the audio heads and video heads produce record patterns on the main track at the azimuth angles of common polarity in triple density mode, and of opposite polarities in standard density mode. On this account, the crosstalk between the audio and video signals can be reduced and the compatibility with conventional systems can be retained as in the previous embodiments.

Although, in the foregoing three embodiments, the record patterns in triple density mode (FIGS. 9 and 18) are formed so that the lower edges of the video and audio tracks coincide with each other, the effects of the present invention can be achieved practically even if the tracks have a displacement at their lower edges within a quarter of the track pitch (19.3 μm), i.e., approximately 5 μm.

We claim:

1. A magnetic recording and reproduction system of a helical scan type capable of recording and reproducing a plurality of information signals with a rotary magnetic head unit and operable selectively in a first operation mode in which a magnetic recording medium is transported at a standard speed for a recording and reproducing operation and a second operation mode in which the magnetic recording medium is transported at a lower speed as to obtain a longer recording and reproducing time than in said first operation mode using a same length of recording medium, comprising:

a first pair of rotary magnetic heads having different azimuth angles of gaps and disposed with an angular spacing of about 180 degrees from each other, said first pair of rotary magnetic heads being supplied with a first information signal for recording; and a second pair of rotary magnetic heads having azimuth angles of gaps different from each other and from said first pair of rotary magnetic heads and disposed with an angular spacing of about 180 degrees from each other, said second pair of rotary magnetic heads being supplied with a second information signal having different major frequency components from those of said first information signal, said first and second pairs of rotary magnetic heads being disposed in the axial direction of rotation with an offset therebetween such that a pattern of record produced in recording by each of said first pair of rotary magnetic heads is at least partly overlaid by a pattern of record produced in recording by a corresponding one of said second pair of rotary magnetic heads, and, in said first operation mode, a large difference of azimuth angles of any one of said first pair of rotary magnetics heads and the corresponding one of said second pair of rotary magnetic heads is produced on substantially overlapping scanning tracks of said ones of said first and second pairs of rotary magnetic heads, and, in said second operation mode, a small difference of azimuth angles of any one of said first pair of rotary magnetic heads and the corresponding one of said second pair of rotary magnetic head is produced on substantially overlapping scanning tracks of said ones of said first and second pairs of rotary magnetic heads.

2. A magnetic recording and reproduction system according to claim 1, wherein said first and second pairs of rotary magnetic heads have effective gap widths larger than a track pitch of a magnetic recording medium in said second operation mode, and said offset between said first and second pairs of rotary magnetic heads has a value larger than said track pitch.

3. A magnetic recording and reproduction system according to claim 1, wherein said first pair of rotary magnetic heads is used to record or reproduce a frequency-modulated audio signal, and said second pair of rotary magnetic heads is used to record or reproduce a frequency-modulated luminance signal in a video signal and a carrier chrominance signal with its carrier frequency being converted to have a frequency band below the frequency band below the frequency band of said luminance signal.

4. A magnetic recording and reproduction system according to claim 1, wherein said second operation mode is set to have a tape speed one-third that of said first operation mode, and said first and second pairs of rotary magnetic heads are disposed to have said offset d therebetween in the axial direction of rotation satisfying a relation $d \approx T_1 \cdot \phi/180 + T_1$, where $\phi$ is an angular spacing (measured in degrees) in the planar arrangement of said first and second pairs of rotary magnetic heads and $T_1$ is a track pitch in said second operation mode.

5. A magnetic recording and reproduction system according to claim 1, further comprising a third pair of rotary magnetic heads having a same azimuth angle as that of said second pair of rotary magnetic heads, said first pair of rotary magnetic heads being used for recording or reproducing an audio signal, said second pair of rotary magnetic heads being disposed with an angular spacing of $\phi_1$ from said first pair of rotary magnetic heads and used to record or reproduce a video signal in said second operation mode, said third pair of rotary magnetic heads being disposed with an angular spacing of $\phi_2$ from said first pair of rotary magnetic heads and used to record or reproduce a video signal in said first operation mode, said first and second pairs of rotary magnetic heads being provided therebetween with an offset $d_1$ satisfying an equation $d_1 \geq T_1 \cdot \phi_2/180$, where $T_1$ is a track pitch of the magnetic tape in said second operation mode, said first and third pairs of rotary magnetic heads being provided therebetween with an offset $d_2$ satisfying an equation $d_2 \geq T_2 \cdot \phi_2/180$, where $T_2$ is a track pitch of the magnetic tape in said first operation mode.

6. A magnetic recording and reproduction system according to claim 5, wherein said offset $d_1$ satisfies a relation $d_1 \approx T_1 \cdot \phi_1/180 + T_1$.

7. A magnetic recording and reproduction system according to claim 1, further comprising a third pair of rotary magnetic heads having a same azimuth angle as that of said second pair of rotary magnetic heads, said first pair of rotary magnetic heads being used for recording or reproducing an audio signal, said second pair of rotary magnetic heads being disposed with an angular sapcing of $\phi$ from said first pair of rotary magnetic heads and used to record or reproduce a video signal in said second operation mode, said third pair of rotary magnetic heads being disposed adjacent to said second pair of rotary magnetic heads and used to record or reproduce a video signal in said first operation mode, said first and second pairs of rotary magnetic heads being provided therebetween with an offset $d_1$ satisfying an equation $d_1 \geq T_1 \cdot \phi/180$, where $T_1$ is a track pitch of the magnetic tape in said second operation mode, said first and third pairs of rotary magnetic heads being provided therebetween with an offset $d_2$ satisfying an equation $d_2 \geq T_1 \cdot \phi/180$, where $T_2$ is a track pitch of the magnetic tape in said first operation mode.

8. A magnetic recording and reproduction system according to claim 7, wherein said offset $d_1$ satisfies a relation $d_1 \approx T_1 \cdot \phi/180 + 2T_1$.

9. A magnetic recording and reproduction system according to claim 1, wherein said first pair of rotary magnetic heads have azimuth angles of gaps of $+\theta_1$ and $-\theta_1$, and said second pair of rotary magnetic heads have azimuth angles of gaps $+\theta_2$ and $-\theta_2$ different in value from said $\theta_1$, both pairs of rotary magnetic heads being disposed such that said first and second pairs of rotary magnetic heads have opposite polarities of directions of azimuth angles in said first operation mode and have a common polarity of directions of azimuth angles in said second operation mode.

10. A magnetic recording and reproduction system according to claim 9, wherein said first and second pairs of rotary magnetic heads have effective gap widths larger than a track pitch of a magnetic recording medium in said second operation mode, and said offset between said first and second pairs of rotary magnetic heads has a value larger than said track pitch.

11. A magnetic recording and reproduction system according to claim 9, wherein said first pair of rotary magnetic heads is used to record or reproduce a frequency-modulated audio signal, and said second pair of rotary magnetic heads is used to record or reproduce a frequency-modulated luminance signal in a video signal and a carrier chrominance signal with its carrier frequency being converted to have a frequency band below the frequency band of said luminance signal.

12. A magnetic recording and reproduction system according to claim 9, wherein said second operation mode is set to have a tape speed one-third that of said first operation mode, and said first and second pairs of rotary magnetic heads are disposed to have said offset d therebetween in the axial direction of rotation satisfying a relation $d \approx T_1 \cdot \phi/180 + T_1$, where $\phi$ is an angular spacing (measured in degrees) in the planar arrangement of said first and second pairs of rotary magnetic heads and $T_1$ is a track pitch in said second operation mode.

13. A magnetic recording and reproduction system according to claim 9, further comprising a third pair of rotary magnetic heads having a same azimuth angle as that of said second pair of rotary magnetic heads, said first pair of rotary magnetic heads being used for recording or reproducing an audio signal, said second pair of rotary magnetic heads being disposed with an angular spacing of $\phi_1$ from said first pair of rotary magnetic heads and used to record or reproduce a video signal in said second operation mode, said third pair of rotary magnetic heads being disposed with an angular spacing of $\phi_2$ from said first pair of rotary magnetic heads and used to record or reproduce a video signal in said first operation mode, said first and second pairs of rotary magnetic heads being provided therebetween with an offset $d_1$ satisfying an equation $d_1 \geq T_1 \cdot \phi_1/180$, where $T_1$ is a track pitch of the magnetic tape in said second operation mode, said first and third pairs of rotary magnetic heads being provided therebetween with an offset $d_2$ satisfying an equation $d_2 \geq T_2 \cdot \phi_2/180$, where $T_2$ is a track pitch of the magnetic tape in said first operation mode.

14. A magnetic recording and reproduction system according to claim 13, wherein said offset $d_1$ satisfies a relation $d_1 \approx T_1 \cdot \phi_1/180 + T_1$.

15. A magnetic recording and reproduction system according to claim 9, further comprising a third pair of rotary magnetic heads having a same azimuth angle as that of said second pair of rotary magnetic heads, said first pair of rotary magnetic heads being used for recording or reproducing an audio signal, said second pair of rotary magnetic heads being disposed with an angular spacing of $\phi$ from said first pair of rotary magnetic head heads and used used to record or reproduce a video signal in said second operation mode, said third pair of rotary magnetic heads being disposed adjacent to said second pair of rotary magnetic heads and used to record or reproduce a video signal in said first operation mode, said first and second pairs of rotary magnetic heads being provided therebetween with an offset $d_1$ satisfying an equation $d_1 \geq T_1 \cdot \phi/180$, where $T_1$ is a track pitch of the magnetic tape in said second operation mode, said first and third pairs of rotary magnetic heads being provided therebetween with an offset $d_2$ satisfying an equation $d_2 \geq T_2 \cdot \phi/180$, where $T_2$ is a track pitch of the magnetic tape in said first operation mode.

16. A magnetic recording and reproduction system according to claim 15, wherein said offset $d_1$ satisfies a relation $d_1 \approx T_1 \cdot \phi/180 + 2T_1$.

* * * * *